United States Patent [19]

Debus et al.

[11] Patent Number: 4,868,461
[45] Date of Patent: Sep. 19, 1989

[54] THYRISTOR TRIGGERING DEVICE

[75] Inventors: Gerhard Debus, Idstein; Bernd Bartscher, Wiesbaden, both of Fed. Rep. of Germany

[73] Assignee: Heimann GmbH, Fed. Rep. of Germany

[21] Appl. No.: 111,685

[22] Filed: Oct. 22, 1987

[30] Foreign Application Priority Data

Dec. 15, 1986 [DE] Fed. Rep. of Germany ....... 3642799

[51] Int. Cl.$^4$ .............................................. H05B 41/36
[52] U.S. Cl. ............................. 315/209 SC; 315/241 S
[58] Field of Search ......... 315/209 SC, 241 P, 241 S; 313/634; 354/62

[56] References Cited

U.S. PATENT DOCUMENTS 2,906,901  9/1959  Wilde .................................... 313/11
4,561,429  12/1985  Sato et al. ............................. 354/62
4,680,505  7/1987  Funada et al. ....................... 313/634

FOREIGN PATENT DOCUMENTS 0144645  6/1985  European Pat. Off. .
1538116  10/1969  Fed. Rep. of Germany .
2514528  10/1976  Fed. Rep. of Germany .

*Primary Examiner*—Robert L. Griffin
*Assistant Examiner*—T. Salindong

[57] ABSTRACT

A device for triggering a thyristor uses light pulses or flashes for achieving a galvanic separation between the triggering circuitry and the load circuit. The light pulses are generated by a flashlamp disposed in a housing in which a number of channels extend radially, each channel having a light conductor therein. The light conductors lead to respective individual thyristors which are to be triggered.

10 Claims, 2 Drawing Sheets

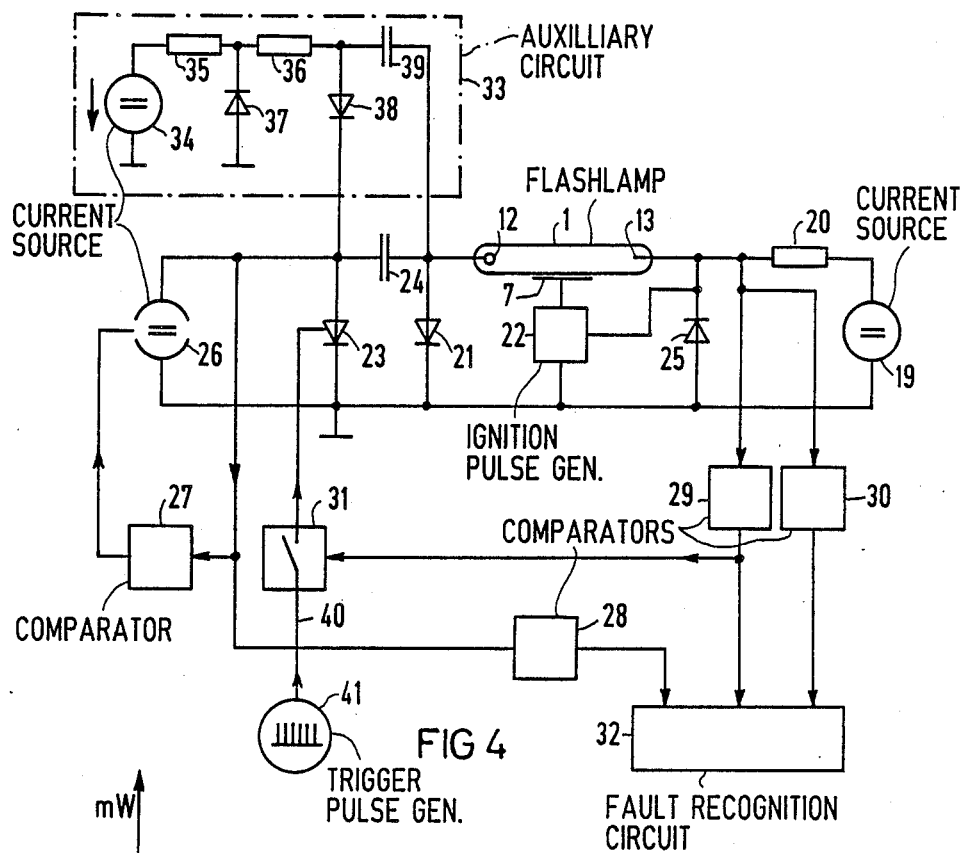
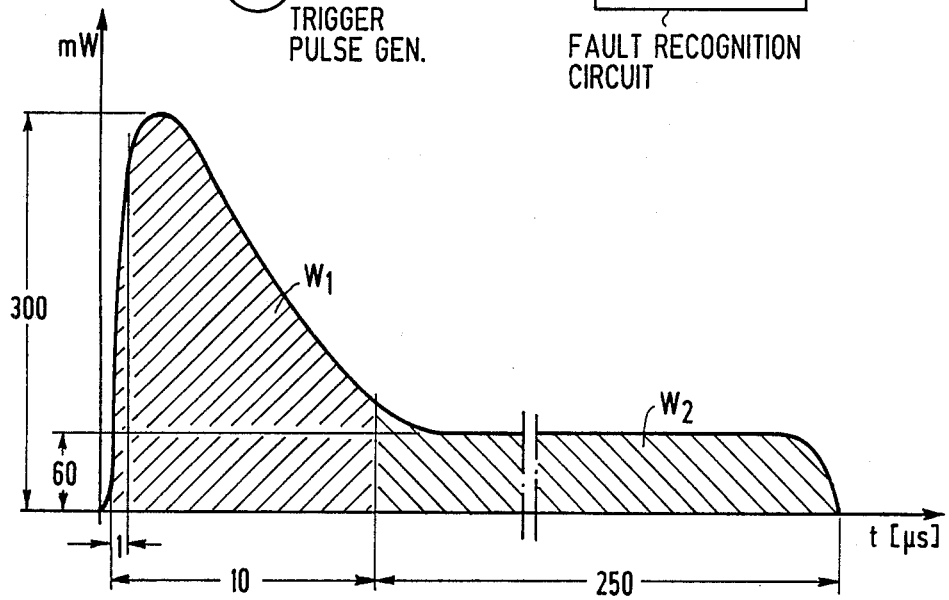

THYRISTOR TRIGGERING DEVICE

BACKGROUND OF THE INVENTION

1. Field of the Invention

The present invention relates to a thyristor triggering device, and in particular to such a device wherein a flashlamp is employed for effecting a galvanic separation between the triggering circuitry and the thyristor to be triggered.

2. Description of the Prior Art

In certain applications, for example, for high voltage dc transmission, it is desirable to galvanically decouple the drive circuit which triggers one or more thyristors from the thyristors themselves. It is known to achieve such a galvanic decoupling by optical triggering, i.e., by transmission of light pulses onto a light-sensitive portion of the thyristor. It is known for such galvanically decoupled triggering to provide a gas discharge lamp which is optically coupled to the thyristor via, for example, a light conductor.

SUMMARY OF THE INVENTION

It is an object of the present invention to provide a thyristor triggering device wherein galvanic separation between the triggering circuit and the thyristor is achieved by optical means, and wherein triggering of a plurality of thyristors is possible using a single flashlamp.

It is a further object of the present invention to provide circuitry for igniting the flashlamp.

The above object is achieved in accordance with the principles of the present invention in a triggering device wherein the flashlamp is disposed in a tubular housing having at least one radial channel therein which receives a light conductor leading from the interior of the housing, in which the flashlamp is disposed, to the exterior of the housing. The housing may be elongated, and thus accommodate a plurality of such radial channels, each having a light conductor therein. The simultaneous ignition of several hundred thyristors is possible in this manner.

In one embodiment, the housing in the region of the plasma channel of the flashlamp may consist of metal, and may be used as the ignition electrode for the flashlamp. The interior diameter of the housing is larger than the exterior diameter of the plasma channel of the flashlamp, which permits coolant to be introduced for cooling the flashlamp.

In a preferred embodiment, the ratio of the length to the diameter of the plasma channel of the flashlamp is in the range of 60:1 through 140:1, and the length of the plasma channel is in the range of 20 through 150 mm. This embodiment provides a thin elongated flashlamp which is especially adapted for the triggering of a plurality of thyristors.

The ignition circuit for the flashlamp includes two current sources, one source for generating a simmer current for effecting a pre-ionization, but not an ignition, of the gas in the flashlamp, and the other for ignition of the flashlamp by operation of a switch. The use of a simmer current assures a low phase jitter, i.e., a low chronological deviation of the pulse rise time from the chronological mean. A third current source may be provided for generating an optimal pulse shape, which includes a trailer. The third current source is connectable in parallel with the second current source after ignition of the flashlamp and maintains the ignition for a selected duration after the pulse peak has decayed.

DESCRIPTION OF THE DRAWINGS

FIG. 4 is a schematic circuit diagram of a circuit for igniting the flashlamp in the device of FIG. 1.

FIG. 5 is a power/time diagram of an ignition pulse which can be achieved by the circuit if FIG. 4.

DESCRIPTION OF THE PREFERRED EMBODIMENTS

Figure 1:
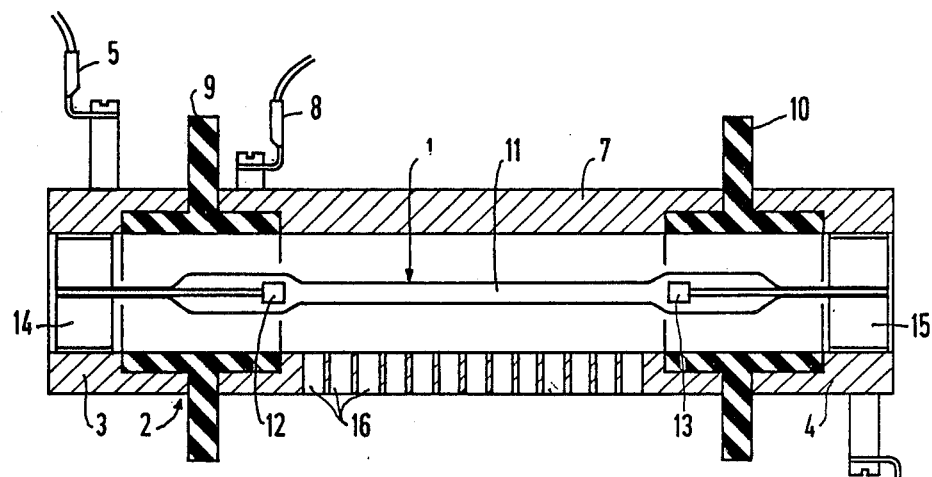
FIG. 1 is a side sectional view of the mechanical components of a thyristor triggering device constructed in accordance with the principles of the present invention.

As shown in FIG. 1, a thyristor triggering device includes a flashlamp 1 which is disposed in a tubular housing 2. The housing 2 has two metallic end sections 3 and 4 connected to respective terminals 5 and 6 for the feed voltage for the flashlamp 1. The housing 2 also has a metallic central section 7, which is connected to an ignition line 8. The sections 3, 4 and 7 are electrically insulated from each other by separators 9 and 10 consisting of insulating material.

Figure 2:
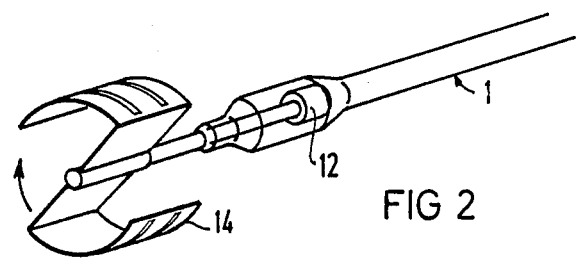
FIG. 2' is a perspective view of one end of the flashlamp used in the device of FIG. 1.

The flashlamp 1 has a plasma channel 11 with two electrodes 12 and 13 at its opposite ends. The electrodes 12 and 13 are connected to respective leaf springs 14 and 15 at the exterior of the flashlamp 1. The leaf springs 14 and 15 respectively press against the interiors of the end sections 3 and 4, and thus produce an electrical connection between the terminals 5 and 6 and the electrodes 12 and 13. A perspective view of the leaf spring 14 is shown in FIG. 2.

Figure 3:
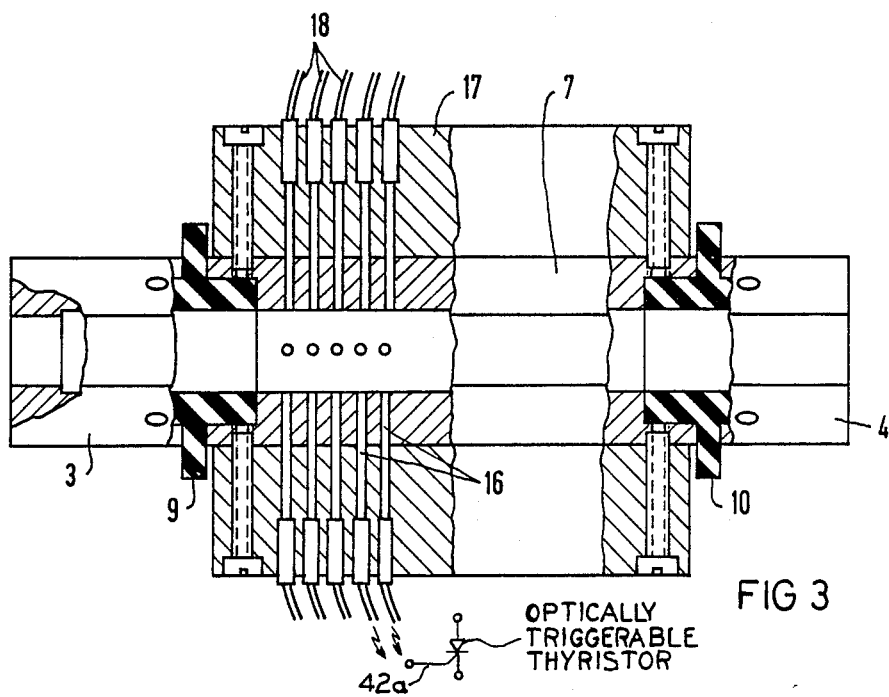
FIG. 3' is a side sectional view of the device of FIG. 1 used for triggering a plurality of thyristors.

The middle section 7 has a plurality of radial channels 16 extending therethrough, through which respective light conductors may be disposed, as shown in FIG. 3, with the respective ends of the light conductors facing the plasma channel 11. Light flashes or pulses can be forwarded through these light conductors to respective thyristors for optical triggering thereof.

The interior diameter of the housing 2 formed by the sections 3, 4 and 7 is larger than the diameter of the flashlamp 1, so that the interior of the housing 2 can be flooded in the longitudinal direction by a coolant, for example, cooling air.

An embodiment for triggering a plurality of thyristors is shown in FIG. 3, wherein the middle section 7 is surrounded by a metallic sleeve 17. The sleeve 17 has a plurality of channels in registry with the channels in the central section 7, with respective light conductors 18 being disposed in these channels. The flashlamp is not shown in FIG. 3. The embodiment of FIG. 3 permits optical triggering of a large number of thyristors using a single flashlamp. Although it will be understood that a plurality of thyristors may be respectively connected to the conductors 18, one such optically triggerable thyristor 42 is shown in FIG. 3, with a trigger electrode 42a receiving light from one of the conductors 18.

Especially favorable conditions, in view of the chronological shape of the light pulses (steep pulse rise, high light power at the end of the light conductor, constant light intensity and triggering delay time from light pulse to light pulse) can be achieved in an embodiment wherein the ratio of the length to the diameter of the plasma channel 11 is in the range of 60:1 through 140:1, and the length of the plasma channel 11 is in the range of from 20 through 150 mm. In order to maintain the luminance of the plasma as stable as possible, i.e., to minimize the variation in light intensity from light pulse to light pulse, the effective operating length of the plasma during operation must be maintained constant. This can be achieved by disposing ends of the plasma channel 11, which forms a capillary tube therebetween.

The leaf springs 14 and 15 not only serve the purpose of providing electrical contact, but also function to mechanically support the flashlamp 1 in the housing 2. The leaf springs 14 and 15 also assist in heat dissipation.

An ignition circuit for the flashlamp 1 is shown in FIG. 4, wherein the ignition electrode formed by the central section 7, and the electrodes 12 and 13, are schematically shown. In order to achieve a steep light pulse rise with a low phase jitter, a simmer current is used to pre-ionize the gas within the flashlamp 1. The simmer current is generated by a current source 19, in a circuit branch which also includes a resistor 20, the flashlamp 1, and a diode 21. An ignition pulse generator 22 is connected to the central section 7 and also assists in generating the simmer current. The actual discharge circuit path is formed by a thyristor 23, a discharge capacitor 24, the flashlamp 1 and a diode 25. Charging of the capacitor 24 is accomplished by a further current source 26. Comparators 27, 28, 29 and 30, and a fault recognition circuit 32, function to control and safeguard the ignition circuit, as explained in detail below. A key or switch 31 connects the trigger electrode of the thyristor 23 (which is not one of the thyristors to be triggered by the flashlamp 1) to a trigger pulse generator 41.

Operation of the circuit of FIG. 4 is as follows: After the line voltage has been switched on, the current source 19 generates a dc voltage of, for example, 600 V, which is supplied to the anode 13 of the flashlamp 1 via the resistor 20, but does not cause ignition of the flashlamp 1. An anode voltage on the order of 300 volts causes the generator 22 to provide ignition pulses to the central section 7 of the flashlamp 1. As a result, free ions arise in the gas within the flashlamp 1. These free ions, due to the difference in potential between the electrodes 12 and 13, cause a slight current to flow, which maintains the pre-ionization. This simmer current flows in the circuit branch consisting of the current source 19, the resistor 20, the flashlamp 1, and the diode 21. This simmer current causes a voltage drop across the resistor 20 which, given adequate emission characteristics of the cathode material, permits the voltage between the electrodes 12 and 13 to drop to such a degree that the ignition generator 22 is de-energized, however, the simmer current is preserved.

A prerequisite for the pulsed current mode for generating a light pulse is a proper simmer current mode. The comparator 29 enables the control signal for the thyristor 23, through the switch 31, if the voltage between th electrodes 12 and 13 of the flashlamp 1 is below a selected value of, for example, 200 V. The pulse current is generated by a periodic pulse discharge of the capacitor 24. The capacitor 24 is initially charged by the current source 26, in a circuit branch which also includes the diode 21. The capacitor 24 is charged to a peak voltage of up to 3.5 kV. When the maximum charging voltage has been reached, the comparator 27 switches the current source 26 off. The pulse discharge occurs through the high voltage thyristor 23. For ignition of the flashlamp 1, the thyristor 23 receives a trigger signal on the line 40 through the switch 31. The discharge current flows from the positive electrode of the capacitor 24 (which is the left electrode in FIG. 4) via the transmissive thyristor 23, the diode 25, the flashlamp 1, and to the negative electrode of the capacitor 24 (which is the right electrode in FIG. 4).

Given incorrect simmer behavior of the flashlamp 1, for example, if the simmer voltage rises to values greater than 200 V as a result of the simmer current being too low, the periodic discharge of the capacitor 24 is interrupted by inhibiting the trigger signal for the thyristor 23 via the switch 31. Simultaneously, a malfunction alarm is provided by the fault recognition circuit 32. Such a simmer voltage rise may be caused, for example, by a decay in the simmer current due to aging. transgression of a maximum value of, for example, 180 V is reported to the fault recognition circuit 32 by the comparator 30, and causes a preliminary alarm to be generated indicating the impending outage of the flashlamp 1. An outage of the periodic charging voltage time function, for example given outage of the current source 26, the thyristor 23, the capacitor 24 or the diode 21, is reported via the comparator 28.

The circuit of FIG. 4 has the following advantages. The current sources 19 and 26 have a common grounded potential of the same polarity, i.e., there are no "floating" current sources in the circuit. Such floating current sources, as in known, have technical and structural problems associated therewith, particularly in high voltage circuits. Moreover, the thyristor 23 has a grounded potential at its cathode side, and can therefore be simply triggered. No additional measures for insulating the cathode are required, and a pulse transformer which would otherwise be necessary for the gate control, can be eliminated. The cathode emission of the flashlamp 1 can be monitored in a simple manner by anode voltage measurement during the simmer mode and during the pauses between pulses, so that deterioration of the flashlamp due to aging can be easily identified.

A simple circuit also results due to the use of the current source 19 for generating the simmer current. In applications wherein the demands on the rise time of the light pulses are not as critical, the current sources 19 and 26 may have the same voltages. In this case, a single voltage source may be used.

If an optimally low switching time is desired, either the diode 21 may have a high inhibit voltage with a low mean dc value, or the diode 25 may have a low inhibit voltage with a high periodic pulsed current, to effect the necessary decoupling.

The controlled current source 26, and the current source 19, may be, for example, blocking oscillators which are supplied with an intermediate circuit voltage of 24 V. This permits battery-buffered operation in a simple manner, and permits the circuit to be fed by the emergency power supply used in convention high voltage dc transmission systems.

The ignition circuit of FIG. 4 may be augmented by an auxiliary circuit 33. The auxiliary circuit 33 includes a current source 34, two resistors 35 and 36, two diodes 37 and 38, and a capacitor 39. The auxiliary circuit 33 generates a pulse trailer at the trailing side of the generated light pulses. The shape of the light pulse which can be generated with the circuit of FIG. 4, including the auxiliary circuit 33, is shown in FIG. 5. This pulse has a steep rise, a flatter decay, and a pulse trailer at the end thereof. For the purpose of generating the pulse trailer, the current source 34 continuously charges the capacitor 39 to, for example 600 V. When the voltage across the capacitor 24 during discharge falls below the voltage of the capacitor 39, the capacitor 39 is connected to the flashlamp 1 via the diode 38.

In FIG. 5, the light power in milliwatts is shown on the ordinate, and the time in microseconds is shown on the abscissa. The energy $W_1$ is supplied by the capacitor 24, and the energy $W_2$ is supplied by the capacitor 39.

Although modifications and changes may be suggested by those skilled in the art it is the intention of the inventors to embody within the patent warranted hereon all changes and modifications as reasonably and properly come within the scope of their contribution to the art.

We claim as our invention:

1. A device for triggering a thyristor having a light sensitive trigger electrode, said device comprising:
   a flashlamp;
   a tubular housing having a hollow interior in which said flashlamp is disposed, said housing having at least one radial channel therein leading from an exterior of said housing to said interior;
   a light guide in said channel optically coupling said interior of said housing with said trigger electrode of said thyristor; and
   circuit means for igniting said flashlamp to generate a light pulse to trigger said thyristor via said light guide.

2. A device as claimed in claim 1, wherein said flashlamp has a plasma channel, and wherein said housing consists of metal at least in the region surrounding said plasma channel for use as an ignition electrode connected to said circuit means.

3. A device as claimed in claim 1, wherein said interior of said housing has a larger diameter than said flashlamp so as to permit introduction of a coolant between said housing and said flashlamp.

4. A device as claimed in claim 1, wherein said housing has electrically conductive end sections adapted for connection to a power source, and wherein said flashlamp has an electrically conductive leaf spring at each end thereof, said leaf springs being respectively received in and pressing against said end sections of said housing.

5. A device as claimed in claim 1, wherein said flashlamp has a plasma channel having a length and a diameter, and wherein the ratio of said length to said diameter of said plasma channel is in the range of 60:1 through 140:1, and the length of said plasma channel is in the range of 20 through 150 mm.

6. A device as claimed in claim 1, wherein said flashlamp has a plasma channel disposed between two enlarged ends, each end having an electrode therein disposed immediately adjacent said plasma channel.

7. A device as claimed in claim 1, wherein said circuit means comprises:
   a first current source means connected to said flashlamp for generating a simmer current for pre-ionizing but not igniting said flashlamp; and
   a second current source means connectable to said flashlamp through a switch for igniting said flashlamp upon closure of said switch.

8. A device as claimed in claim 7, wherein said circuit means further comprises a third current source means connected in parallel with said second current source means after closure of said switch, said second current source means causing generation of a light pulse by said flashlamp and said third current source means causing generating by said flash lamp of a trailer to said 9. A device for triggering a plurality of thyristors, each thyristor having a light sensitive trigger electrode, said device comprising:
   an elongated flashlamp;
   a tubular housing having a hollow interior in which said flashlamp is disposed, said housing having a plurality of radial channels therein leading from an exterior of said housing to said interior;
   a plurality of light guides respectively disposed in said channels, each light guide optically coupling said interior of said housing with the trigger electrode of one of said thyristors; and
   circuit means for igniting said flashlamp to generate a light pulse to trigger said thyristors via said light guides.

10. A device for triggering a plurality of thyristors, each thyristor having a light-sensitive trigger electrode, said device comprising:
    an elongated flashlamp;
    a tubular housing having a hollow interior in which said flashlamp is disposed, said housing having a plurality of radial channels therein leading from an exterior of said housing to said interior;
    a sleeve surrounding said tubular housing having a like plurality of channels therein respectively and registry with the channels in said housing;
    a plurality of light guides respectively disposed in said channels of said housing and said sleeve, each light guide optically coupling said interior of said housing with the trigger electrode of one of said thyristors; and
    circuit means for igniting said flashlamp to generate a light pulse to trigger said thyristors via said light guides.

* * * * *